United States Patent
Floch et al.

[11] Patent Number: 5,858,526
[45] Date of Patent: Jan. 12, 1999

[54] COMPOSITE MATERIAL WITH A HIGH REFRACTIVE INDEX, PROCESS FOR PRODUCING SAID COMPOSITE MATERIAL AND OPTICALLY ACTIVE MATERIAL INCORPORATING SAID COMPOSITE MATERIAL

[75] Inventors: Hervé Floch, Quincy S/S Senart; Philippe Belleville, Courbevoie, both of France

[73] Assignee: Commissariat A L'Energie Atomique, Paris, France

[21] Appl. No.: 569,136

[22] PCT Filed: Jul. 13, 1994

[86] PCT No.: PCT/FR94/00875

§ 371 Date: Mar. 22, 1996

§ 102(e) Date: Mar. 22, 1996

[87] PCT Pub. No.: WO95/02835

PCT Pub. Date: Jan. 26, 1995

[30] Foreign Application Priority Data

Jul. 16, 1993 [FR] France ................... 93 08762

[51] Int. Cl.⁶ ........................................ B32B 5/16
[52] U.S. Cl. .................. 428/327; 428/328; 428/331; 428/404; 428/407
[58] Field of Search .................... 428/331, 323, 428/328, 403, 404, 407, 327

[56] References Cited

U.S. PATENT DOCUMENTS

| 2,432,484 | 12/1947 | Moulton | 359/580 |
| 3,751,326 | 8/1973 | Marks | 428/327 |
| 4,016,129 | 4/1977 | Miyosawa | 428/446 X |
| 4,478,909 | 10/1984 | Taniguchi et al. | 428/331 |
| 4,802,740 | 2/1989 | Hotta et al. | 350/341 |
| 5,134,021 | 7/1992 | Hosono et al. | 428/213 |

FOREIGN PATENT DOCUMENTS

| 001498 | 4/1979 | European Pat. Off. . |
| 318196 | 5/1989 | European Pat. Off. . |
| 2 680 583 | 8/1991 | France . |
| 25 34 103 | 12/1976 | Germany . |
| 30 18 235 | 11/1980 | Germany . |
| WO-9305878 | 4/1993 | WIPO . |

*Primary Examiner*—H. Thi Le
*Attorney, Agent, or Firm*—Oblon, Spivak, McClelland, Maier & Neustadt, P.C.

[57] ABSTRACT

The invention relates to a composite material having a high refractive index, its production process, as well as optically active materials such as antireflection materials and reflecting materials manufactured from the composite material. This composition material with a high refractive index is characterized in that it comprises $SiO_2$ or metal oxide colloids (1), coated in a polyvinyl material (3), soluble in a water-containing alcoholic solvent.

15 Claims, 3 Drawing Sheets

COMPOSITE MATERIAL WITH A HIGH REFRACTIVE INDEX, PROCESS FOR PRODUCING SAID COMPOSITE MATERIAL AND OPTICALLY ACTIVE MATERIAL INCORPORATING SAID COMPOSITE MATERIAL

BACKGROUND OF THE INVENTION

1. Field of the Invention

The invention relates to a composite material having a high refractive index, its production process, as well as optically active materials such as antireflection and reflecting materials made from said composite material.

2. Description of the Prior Art

Antireflection and reflecting materials are formed by an organic or inorganic substrate, covered with several coatings, certain of which have sought, specific, optical properties. More specifically, interferential dielectric mirrors incorporating a substrate, covered with a dielectric film reflecting one or more desired wavelengths, whilst having a relatively low intrinsic absorption compared with the metals conventionally used for producing such mirrors. Antireflection or reflecting materials have numerous applications.

Thus, organic or inorganic substrates, i.e. in particular plastics or vitreous substrates, coated with an antireflection film have particular interest in the fields of ophthalmic and video products or architectural applications, such as glass panels placed on the outside of buildings. In addition, antireflection materials and interferential dielectric mirrors can also be used in high energy lasers, solar, thermal and photovoltaic applications or in integrated optical systems.

The prior art already discloses processes making it possible to produce antireflection materials or interferential dielectric mirrors and said processes are referred to hereinafter.

Thus, U.S. Pat. No. 2,466,119 discloses a process for the preparation of multilayer, reflecting and/or antireflection films, by hydrolysis and condensation of mixtures of titanium halides and/or silicon alkoxides. The porosity of said layers is controlled by varying the temperature. However, the obtaining of layers having a good mechanical strength requires heating to temperatures above those which can be withstood by conventional plastics, whose maximum thermal stability is 150° C.

The NTIS U.S. patent application 7 148 458 corresponding to U.S. Pat. Nos. 4,929,278 and 4,699,812, describes a process for depositing antireflecton films on plastic substrates consisting of synthesizing an ethanol gel in the $SiO_2$—$B_2O_3$—$Al_2O$—$BaO$ system until a certain molecular complexity is obtained, followed by the reliquefying of said gel by mechanically breaking certain interpolymer bridges. This gives a porous film with a low refractive index of approximately 1.23, produced at ambient temperature, which permits an adaptation to plastic substrates. However, this film only has a mediocre abrasion resistance.

U.S. Pat. Nos. 2,432,484 and 4,271,210 disclose the possibility of using silica or alumina colloids for producing antireflection dielectric coatings, making it possible to increase the porosity of said coatings and therefore lower their refractive indexes. However, the colloidal coatings obtained have a very poor mechanical strength and are particularly sensitive to any physical contact.

Moreover, although in the solar sector, plastics such as polycarbonates, polyacrylates, polyallyl carbonates, etc. are particularly interesting, vitreous substrates are also of interest, particularly in the field of general optics. However, it is clear that due to approximately 4% reflection losses for each air-glass interface encountered (the average index of glass being 1.5), the balance of losses for a complex optical system is often disadvantageous.

Therefore optical experts have long sought to create antireflection films by the use of physical processes such as vacuum deposition or evaporation. However, these processes are sophisticated and expensive, not generally being adapted to large scale, inexpensive production.

Finally, French patent application FR-A-2 680 583 of the CEA describes a material having antireflection properties, as well as abrasion resisting and hydrophobic properties. This material comprises an organic or inorganic substrate, successively covered by an adhesion promoting coating made from a material chosen from among silanes, an antireflection coating of silica colloids coated with a siloxane binder, a coupling agent coating formed from a material chosen from among the silazanes and an antiabrasive coating of a fluorine polymer. However, this material has a relatively small spectral transmission window of only about 100 nm.

The prior art includes documents describing more specifically materials having reflecting properties, as well as their production process.

U.S. Pat. No. 3,460,956 describes the preparation of $TiO_2$ reflecting films obtained from tetraalkyl titanate hydrolyzates in an alcoholic medium. However, for an effective conversion of the polymer film into dense oxide, said film must undergo heating at high temperatures of about 500° C. and which are therefore prejudicial to the entire organic substrate.

U.S. Pat. No. 2,710,267 describes the production of reflecting $TiO_2$ films from alcoholic sols of a titanium alkoxide, said sols being hydrolyzable by atmospheric moisture. However, the coatings obtained are not abrasion resistant.

The CEA French patent application 2 682 486 describes the preparation of dielectric mirrors having a high laser flux resistance using a process performed at ambient temperature, which permits an adaptation to organic substrates. The films having the desired optical properties are prepared from colloidal suspensions, which are deposited by alternating a material with a low refractive index with a material having a high refractive index.

However, the colloidal coatings used are by their very nature porous, which leads to a low refractive index, compared with that of the same material in dense form. Consequently, for an equivalent reflectivity, it is necessary to stack a larger number of coatings in order to obviate this index difference, which increases the production times and costs.

In order to meet the deficiencies or defects of the products described hereinbefore, the invention consists of the development of a novel material having a high refractive index and the use thereof in the production, at ordinary temperature, of optically active materials. The latter are e.g. either materials having antireflection properties over a wide spectral band and good water repelling properties and abrasion resistance properties, or reflecting materials which may or may not have e.g. abrasion resisting properties.

SUMMARY OF THE INVENTION

To this end, the invention relates to a composite material having a high refractive index. According to the features of the invention, said material comprises a mineral phase constituted solely by $SiO_2$ or metal oxide colloids, coated in a polyvinyl polymer, soluble in a solvent containing alcohol and water, said polymer being chosen from among polyvinyl pyrrolidones and polyvinyl alcohols.

As a result of these features of the invention, the organic polymer coats the colloids and decreases the residual open porosity thereof. This leads to an increase in the refractive index of the deposited coating, an increase in the mechanical, abrasion resistance properties (because the polymer serves as a binder between the particles) and an improvement of the laser flux resistance. It should be noted that by varying the proportion of the polymer compared with the colloids, it is possible to vary the properties of the composite, i.e. the refractive index, the abrasion resistance and the laser flux resistance.

Preferably, by weight, the material comprises approximately 60 to 99% colloids of metal oxide or $SiO_2$ and between approximately 1 and 40% polyvinyl polymer.

As a result of this composition, the material according to the invention has a high refractive index. The presence of a limited quantity of the vinyl polymer makes it possible to increase the refractive index by plugging the residual pores. Conversely, if the polymer quantity exceeds a certain threshold, it becomes too large and the refractive index drops.

The invention also relates to a process for the preparation and deposition of said composite material. According to the features of the invention, said process comprises stages consisting of:

preparing a suspension of metal oxide or $SiO_2$ colloids dispersed in an aliphatic alcohol, mixing said colloidal suspension with a polyvinyl polymer soluble in a solvent containing alcohol and water, depositing the mixture obtained on a support in order to form a uniform coating and crosslinking said coating by an irradiation treatment with ultraviolet rays with a wavelength between approximately 180 and 280 nm.

This process is performed at ambient temperature, so that it can be applied to plastics material substrates.

The invention also relates to an optically active material, characterized in that it comprises a substrate having an organic or inorganic nature covered by at least one aforementioned, composite material coating.

The invention also relates to two particular types of optically active materials, namely an antireflection material and a dielectric mirror.

The antireflection material is characterized in that it comprises an organic or inorganic substrate successively covered by:

an adhesion promoting coating formed from a material chosen from among the organosiloxanes, a coating having an average-refractive index, formed from a material incorporating an organosiloxane and an organometallic material modified by fixing organic radicals, a coating of the aforementioned, high refractive index material, a bonding agent coating formed from a material chosen from among the organosiloxanes, a low refractive index coating formed by silicon dioxide, calcium fluoride or magnesium fluoride colloids coated with a siloxane binder, a coating of a coupling agent chosen from among perfluorosiloxanes and silazanes, and an antiabrasive coating based on a fluorine polymer.

The structure of the material has been optimized so as to obtain a maximum transmission optical response in a wide spectral range. The refractive index formula retained for complying with this criterion is of the type average index/high index/low index. Thus, the specular reflection of the treated substrates is reduced by increasing their transmission.

The presence of intermediate, adhesion promoting coatings makes it possible to actively reinforce the fixing of the antireflection coating to the substrate and ensure an effective chemical bond between the optically active coatings of the stack.

Moreover, the final impregnation of the treated substrate with an antiabrasive, fluorine polymer coating with a low refractive index, retained by the coupling agent coating, makes it possible to preserve the antireflection properties, whilst increasing the abrasion resistance. The fluorine polymer coating also gives the deposit its antiadhesive and hydrophobic character.

The thus prepared coatings are homogeneous and free from fine cracks and/or internal cleaving planes. Consequently, the antireflection film obtained is sufficiently elastic to accept possible torsions or deformations when applied to a plastic substrate. The film also withstands a humid, saline heat atmosphere and has a long life once immersed in boiling water.

Finally, the invention also relates to a reflecting material, characterized in that it comprises an organic or inorganic substrate successively covered by at least one group of two coatings comprising:

a coating having a low refractive index formed from silicon dioxide, calcium fluoride or magnesium fluoride colloids, which may or may not be coated with a siloxane binder and a coating with a high refractive index formed from the aforementioned composite material.

The reflecting material obtained is a monochroic or polychroic, passive, dielectric mirror, reflecting wavelengths from the near ultraviolet to the near infrared.

The composite, high refractive index material is particularly suitable for producing multilayer, interferential mirrors. Thus, to obtain a given reflectivity, the number of layers or coatings necessary varies according to an inverse function of the ratio of the refractive indexes (in the case of a reflecting stack of quarter wave coatings with 2 refractive indexes). The alternating deposition of a low refractive index coating (low index: $n_B$) and a high refractive index coating (high index: $n_H$), will have a decreasing number of coatings as the support ($n_H$:$n_B$) becomes large. Moreover, the spectral width will also be a function of the difference between the two indexes.

Whilst retaining a process for the production of multicoating mirrors at ambient temperature, through the use of colloidal base solutions, the number of coatings necessary for obtaining a given reflectivity is decreased by a factor of 1.5 to 2, due to the use of the high refractive index material. This makes it possible to reduce the production time and therefore the contamination risks.

BRIEF DESCRIPTION OF THE DRAWINGS

The invention is described in greater detail hereinafter relative to a nonlimitative embodiment and with reference to the attached drawings, wherein show.

DESCRIPTION OF THE PREFERRED EMBODIMENTS

Figure 1:
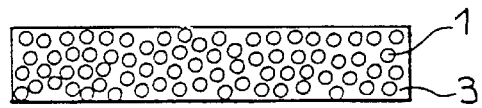
FIG. 1 A sectional view of the high refractive index material according to the invention.

As illustrated in FIG. 1, the high refractive index material according to the invention is a composite material having a mineral phase ($SiO_2$ or metal oxide colloids 1) and an organic phase (organic polymer 3).

Preferably, the metal oxide colloids 1 are colloids chosen from among scandium oxide, yttrium oxide, lanthanum oxide, titanium oxide, zirconium oxide, hafnium oxide, thorium oxide, niobium oxide, tantalum oxide and aluminium oxide.

Advantageously, the organic polymer 3 is a polyvinyl polymer soluble in a solvent incorporating an alcohol and water. This polymer is chosen from among polyvinyl pyrrolidones ($C_6H_9ON$) and polyvinyl alcohols($(CH_2-CHOH)_n$)

Figure 2A:
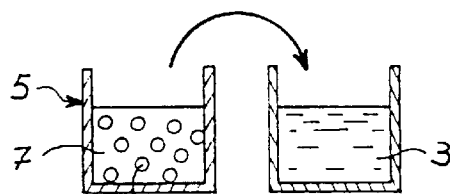
FIG. 2 The different production stages of the material shown in FIG. 1.
Figure 2B:
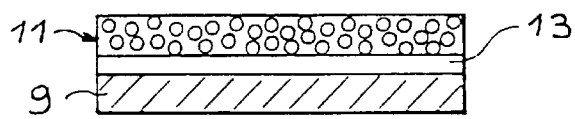
Figure 2C:
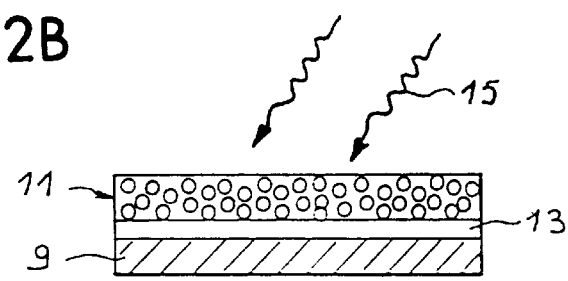

FIGS. 2a to 2c illustrate the process for the production and deposition of said high refractive index material.

The first stage of the process consists of forming a colloidal suspension 5 from the aforementioned metal-oxide colloids placed in a solvent 7. The solvent 7 is preferably chosen from among saturated aliphatic alcohols of formula ROH, in which R represents an alkyl with 1 to 4 carbon atoms. The CEA French patent 2 682 486 describes processes for the preparation of such colloidal suspensions.

The thus obtained colloidal suspension 5 is mixed with the aforementioned organic polymer 3 so as to obtain a "sol" whose solvent is largely alcohol. This mixture is formed accompanied by mechanical stirring and if need be under ultrasound. The composite sol is homogeneous and stable. The respective proportions of the $SiO_2$ or metal oxide colloids and the polymer are, by weight, between approximately 2 and 8% and approximately between 0.1 and 2%, based on the solvent containing the alcohol and the water. In general, the solvent contains 5 to 30% water.

As illustrated in FIG. 2b, the thus obtained, high refractive index material is deposited on a support 9 in the form of a coating 11. The general term support 9 is used to designated any organic or inorganic substrate, such as those to be described hereinafter or any other coating which is optically active or favours adhesion and which is deposited on said substrate. The deposition of the coating 11 e.g. takes place by immersion, laminar flow or spin coating or by any other method permitting the obtaining of a uniform deposit.

Advantageously, but not necessarily, an adhesion promoting coating 13 is placed between the support 9 and the coating 11.

Finally, FIG. 2c illustrates the third stage of the process consisting of carrying out a UV irradiation treatment of the coating 11. This UV treatment is designated 15. The treatment is performed under a mercury vapour UV lamp, emitting in the UV-B and UV-C range (180 to 280 nm wavelength). This treatment leads to a virtually complete crosslinking of the organopolymer 3 coating the colloids 1.

The thus prepared composite material has a higher refractive index than the same material in colloidal form. Table 1 gives in the form of comparative examples, the different refractive index values for certain of the materials usable in the invention when they are in the form of colloidal coatings or in the form of composite material coatings. Table 1 also gives the refractive index values of the polymers alone, used in the production of the composite material.

TABLE 1

| MATERIAL | REFRACTIVE INDEX |
|---|---|
| Polyvinyl alcohol (PVA) | 1.51 |
| Polyvinyl pyrrolidone (PVP) | 1.53 |
| Polyvinyl butyral (PVB) | 1.49 |
| $SiO_2$ | 1.22 |
| $Al_2O_3.H_2O$ | 1.44 |
| $Al_2O_3.H_2O$—PVA | 1.55 |
| $HfO_2$ | 1.55 |
| $HfO_2$—PVA | 1.68 |
| $ZrO_2$ | 1.57 |
| $ZrO_2$—PVA | 1.69 |
| $ZrO_2$—PVP | 1.72 |
| $TiO_2$ | 1.82 |
| $TiO_2$—PVP | 1.92 |

The refractive index gain is generally between 0.10 and 0.15. It is found that the composite $TiO_2$-PVP coating has a higher refractive index than that of $ZrO_2$-PVP. Consequently, the use of this material ($TiO_2$-PVP) in the production of a dielectric mirror makes it possible to deposit a smaller number of coatings. However, it is necessary to reserve the use of the $TiO_2$-based composite for uses other than lasers. Thus, this oxide has an intrinsic absorption of the light energy which limits its resistance to the laser flux to low power values. However, the composite material ($TiO_2$-PVP) is ideal for other applications (integrated optics, semi-reflecting plate on plastic), because when it is associated with colloidal silica, it forms the highest index ratio pair: 1.57 for $TiO_2$-$PVP/SiO_2$ instead of 1.41 for $ZrO_2$-$PVP/SiO_2$.

The optically active material according to the invention comprises at least one high refractive index composite material coating like that described hereinbefore. Several specific examples of such optically active materials are described hereinafter. However, the invention covers all optically active materials incorporating not only a high refractive index composite material coating but also any other random combination of optically active coatings and coatings favouring the adhesion of the coatings to one another, such as those described hereinafter.

As a function of the nature of the optical coatings, their thickness and their arrangement with respect to one another, antireflection or reflecting materials are obtained.

Figure 3:
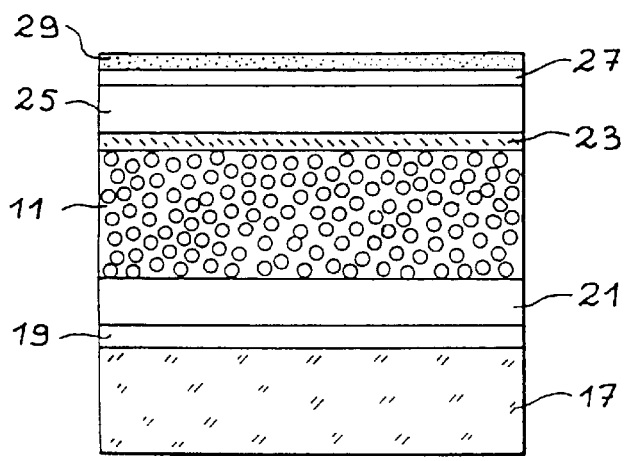
FIG. 3 A sectional view of the antireflection material according to the invention.

FIG. 3 illustrates an example of the application of this high refractive index material to the production of an antireflection material having a wide spectral band, with good water repelling properties and abrasion resisting properties.

According to the characteristics of the invention, said material successively comprises:
- an organic or inorganic substrate 17,
- an adhesion promoting coating 19 of a material chosen from among the organosiloxanes, an average refractive index coating 21 of a material incorporating an organosiloxane and an organometallic material modified by the fixing of organic radicals, a high refractive index coating 11 formed by the aforementioned composite material, a bonding agent coating 23 produced from a material chosen from among the organosiloxanes, a low refractive index coating 25 formed from silica, calcium fluoride or magnesium fluoride colloids coated with a siloxane binder, a coating 27 of a coupling agent chosen from among the perfluorosiloxanes, and a fluorine polymer antiabrasive coating 29.

The terms low, average and high refractive indexes must be respectively interpreted as meaning that the index is below about 1.4, between approximately 1.4 and 1.6 and above approximately 1.6.

Throughout the remainder of the description, the term "organic substrate" more specifically designates a plastic substrate, e.g. chosen from among polyacrylates, polycarbonates, polyallyl carbonates and polyamides. However, this list is not limitative and in more general terms covers polymer materials.

The term "inorganic substrate" more specifically covers a vitreous substrate, e.g. amorphous or even crystalline materials and in particular silica, borosilicate glasses, fluophosphates and phosphates.

Compared with vitreous substrates, plastic substrates are in particular less expensive, easier to shape, lighter and less sensitive to shocks and impacts.

The adhesion promoting coating 19 brings about a good adhesion of the average refractive index coating 21 to the substrate 17. According to the invention, said adhesion promoter is chosen from among the organosiloxanes. Among the latter, the epoxy-alkoxy silanes are the most effective when the substrate is inorganic. When the substrate is organic, preference is given to the use of γ-amino-alkyl alkoxysilanes and epoxy-oxo-alkyl alkoxysilanes. It is also possible to add a condensation catalyst to the epoxy-alkoxysilane compounds. Thus, 1-methyl imidazole favours coupling reactions.

These alkoxysilane-based compounds which are relatively easily hydrolyzable must be diluted in a dry, aprotic solvent prior to use. Preferably, the solvent is constituted by anhydrous 1-butanol or tetrahydrofuran. However, other aliphatic alcohols or solvents such as toluene, xylenes, hexane, acetonitrile or ethyl acetate can be chosen, provided that there is a good chemical compatibility with the substrate to be treated.

The average refractive index coating 21 is prepared according to the "sol-gel" method standing for the term "solution-gelatin". More specifically, this coating is constituted by a material called ORMOCER (for ORganically MOdified CERamic). This material is formed from inorganic copolymers/organic copolymers. The production of this material is described in the article by S. Amberg-Schwab et al. "High performance ceramic films and coatings" published in 1991. The preparation of this coating 21 is characterized on the one hand by obtaining an inorganic lattice (oxides) from a transition metal alkoxide, modified by the fixing of organic radicals and on the other by the formation of an additional, organic lattice resulting from a copolymerization between organic radicals.

In other words, said coating 21 comprises a mixture of modified metal oxide and methacryl alkoxysilane. According to an exemplified embodiment, said coating is constituted by a mixture of zirconium alkoxide (n-propoxide) complexed by methacrylate in solution in the parent alcohol (n-propanol), with an ethanolic methacryloxypropyltrimethoxysilane solution. Preferably, the mixing takes place with a molar proportion of 2 equivalents of modified zirconium alkoxide for 1 equivalent of methacryloxypropyltrimethoxysilane. This proportion was chosen in order to satisfy the refractive index, mechanical strength of the deposit and stability of the mixture criteria. It would also be possible to use as the metal alkoxide a titanium alkoxide with a methacrylalkoxysilane.

The special features of the coating 21 are its hybrid mechanical and optical properties resulting from the combination of organic and inorganic molecules.

The coating 23 forming the bonding agent between the high refractive index coating 11 and the low refractive index coating 25 is constituted by a material chosen from among the organosiloxanes, in the same way as the adhesion promoting coating 19. Preference is given to the use of a bonding agent chosen from among prehydrolyzed epoxyalkoxysilanes containing a basic condensation catalyst such as 1-methyl imidazole. The sovlent of said bonding agent is a dry, aprotic solvent, e.g. anhydrous 1-butanol or tetrahydrofuran.

The low refractive index coating 25 is also prepared according to the "sol-gel" method. In conventional manner, said coating 25 results from a monodisperse colloid suspension with a diameter of approximately 200 Å, chosen from among silicon dioxide, calcium fluoride or magnesium fluoride and coated with a soluble, polymeric, siloxane binder. The colloids and the binder are synthesized from a molecular precursor. In the invention, preference is given to the use of tetraethylorthosilicate as the silicon dioxide molecular precursor. However, it is also possible to use tetramethylorthosilicate or other silicon alkoxides. For calcium fluoride or magnesium fluoride, the respective precursors will be calcium acetate and magnesium methoxide.

Preferably, said coating 25 comprises, by weight, between approximately 70 and 75% silica colloids and between approximately 25 and 30% siloxane binder. It is also possible to add to said coating a nonionic surfactant such as alkylphenoxypolyethoxyethanol, which makes it possible to increase the wettability of said deposit.

The coupling agent coating 27 is preferably formed on the basis of hexamethyl disilazane dissolved in tetrahydrofuran or for a greater efficiency based on 1H,1H,2H,2H-perfluorodecyltriethoxysilane (FDTS), diluted in 1-butanol or a perfluorine solvent (3M Fluorinet® Montedison Galden®. However, it would also be possible to use other promoters such as silazanes or perfluoroalkoxysilanes and other aprotic or anhydrous solvents.

Although the intermediate, adhesion promoting coatings 19, 23, 27 ensure a better coupling between the substrate 7 and the optically active coatings 21, 11 and 25, the covering still remains slightly vulnerable to mechanical action. Consequently, the invention also relates to the protection of the low refractive index coating 25 by an antiabrasive coating 29 preferably formed from a fluorine polymer with a low refractive index. Thus, in the absence of said antiabrasive coating 29, the low refractive index coating 27 remains porous (approximately 48% residual porosity) and is therefore more mechanically vulnerable than a dense film. Among the fluorine polymers preference is given to a derivative of polytetrafluoroethylene (PTFE) known under the registered trademark Teflon AF, marketed by Du Pont de Nemours. PTFE is obtained by copolymerization of 2,2-bistrifluoromethyl-4,5-difluoro-1,3-dioxole with tetrafluoromethylene. This PTFE derivative has a low refractive index (1.29) and the special feature of being soluble in certain perfluorine compounds such as Fluorinert (registered trademark), marketed by 3M or GALDEN® manufactured by MONTEDISON. Apart from these good mechanical properties, this compound is hydrophobic.

It is important to note that the optical performance characteristics are determined by the formula of the stack of refractive indexes used and by the thickness of the deposited coatings. The good performances submitted are also due to the choice of the high refractive index composite material 11. The widening of the spectral band is possible, whilst retaining a transmission equal to or above 98% on using a four-coating optical stack with the same materials and indexes as mentioned hereinbefore. Thus, with a stack of the type substrate 17/adhesion promoting coating 19/average refractive index coating 21/high refractive index coating 11/average refractive index coating 21/bonding agent coating 23/low refractive index coating $^{25}$/coating 27/coating 29, whose indexes correspond to the aforementioned materials, an antireflection covering is obtained, whose spectral width is approximately 700 nm, with a transmission equal to or higher than 98%, the substrate used being organic or inorganic with an index close to 1.5. So as to ensure mechanical strength characteristics identical to the aforementioned three-coating stack, use is made of the same intermediate, adhesion promoting coatings at the same interfaces and a final, antiabrasive coating deposit.

The optical thicknesses of the different deposited coatings are: quarter wave coating 21/half wave coating 11/quarter wave coating $2^1$/quarter wave coating 25.

The process for depositing the successive coatings of the antireflection material will now be described with reference to FIG. 3.

Advantageously, but optionally, there is firstly a very careful cleaning of the substrate 17 with an aqueous detergent solution (containing in exemplified manner deionized water, Triton-X® 100 or Renex® 690. Substrate 17 is then rinsed with deionized water and then isopropyl alcohol filtered to 0.2 micron. When the substrate 17 is inorganic (vitreous), the cleaning is improved by a controlled exposure to ultraviolet radiation in the presence of ozone. This gives a substrate with very hydrophilic faces.

The following stage consists of applying to the substrate 17 the adhesion promoting coating 19 chosen from among the alkoxysilanes. This coating 19 is applied uniformly to the substrate 17, either by immersion coating or spin coating at a speed between 1500 and 2000 r.p.m., or by laminar flow coating. The two latter methods are preferred, because they only require very little treating solution. However, it would also be possible to use other deposition methods. This type of solution deposition has the advantage compared with the prior art of permitting the coating of relatively large surfaces with very pure, low viscosity treating solutions. In addition, the industrial means used are not sophisticated and are inexpensive.

The second stage is followed by a third stage consisting of applying to the adhesion promoting coating 19 the average refractive index coating 21, e.g. based on zirconium. The deposition methods used are the same as those described hereinbefore.

This is followed by a fourth stage of irradiation under ultraviolet rays in order to photochemically polymerize the olefin groups present in the ORMOCER coating 21.

The fifth stage of the process then consists of depositing the high refractive index coating 11, prepared as described hereinbefore, followed by photopolymerization using UV rays. The sixth stage of the process consists of depositing the coupling agent coating 23 using the aforementioned methods.

Finally, the seventh stage consists of applying the low refractive index coating 25 containing silica colloids coated with a siloxane binder.

There is then an eighth heat treatment stage at about 110° to 120° C. in order to establish the siloxane bridges and organic bridges between the adhesion promoting coatings 19 and 23 and the adjacent coatings 17, 21, 11 and 25.

More specifically, the peripheral silanol groups are broken in order to create energy-producing, covalent bonds of the silicone type and epoxy organic groups create covalent bonds with the olefin or pyrrolidone terminations present at the interfaces.

At this stage of the process, a substrate 17 is obtained covered on both its faces (if deposition takes place by immersion coating) or on one face (if deposition takes place by spin or laminar flow coating) with an antireflection covering having a wide spectral band with an average transmission of 99% over a width of more than 300 nm (the index of the substrate 17 being close to 1.5). Cleaning with an ordinary rag is possible, without leading to any deterioration of the treated surface or surfaces. However, the antireflection coating still remains fragile.

Consequently it is necessary to perform a supplementary stage consisting of depositing the coupling agent coating 27 and then the antiabrasive coating 29. The coating 27 is deposited by immersion, laminar flow or spin coating, as has been described hereinbefore. It has in fact been found that other deposition methods such as spraying or spreading with a roller or scraper gave mediocre results with respect to the coupling efficiency.

The coating 27 is then coated with a highly dilute Teflon AF solution (0.05 to 0.08 wt. %). This is followed by a final heating stage at a temperature between 110° and 120° C. in order-to complete the coupling and evaporate the residual solvent.

Hereinafter is given an example of an antireflection material according to the invention produced with an inorganic substrate. The deposition operations are performed in a minimum class 100 clean environment (US standard) and under a laminar flow.

Example 1: Producing an Antireflection Material

1) Use is made of a silica organic substrate 17 with a diameter of 80 mm, a thickness of 12 mm and a refractive index of 1.46 for a wavelength of 600 nm.

This substrate 17 was cleaned with a detergent solution formed from 0.6 ml of Triton-X 100, 0.6 ml of Renex 690 (registered trademarks) and 60 ml of pure, deionized water. The substrate 17 was then abundantly rinsed with deionized water and then isopropyl alcohol filtered to 0.2 micron. The substrate 17 was then placed in an ozone/UV photoreactor (of the type Pr100 marketed by the UVP Inc.) with $O_2/H_2O_2$ bubbling for a cycle lasting 5 minutes so as to make the faces of the substrate 17 highly hydrophilic.

2) This was followed by the preparation of a solution A by diluting to 10 wt. % 3-glycidoxypropyltrimethoxysilane (i.e. 20 g) in 1-butanol (180 g) dried on a molecular sieve. This alkoxysilane compound is prehydrolyzed for a minimum of 16 hours by 1.5 molar equivalent of deionized water (2.3 g) and undergoes at least 3 hours prior to deposition the addition of a basic catalyst at a rate of 0.1 molar equivalent of 1-methyl imidazole (0.7 g).

3) A solution B was prepared by mixing a solution C with a solution D.

Solution C corresponds to a mixture of 10.6 g of zirconium tetra-n-propoxide complexed by the addition of 5.57 g (i.e. 2 molar equivalents) of methacrylic acid. This gives a 10 wt. % solution C of zirconium dimethacrylate di-n-propoxide in 96.3 g of n-propanol.

Solution D is a 10 wt. % solution of 40 g of 3-methacryloxypropyltrimethoxysilane in 355 g of absolute ethanol. This solution D is prehydrolyzed by adding 1.5 molar equivalent (i.e. 5 g) of deionized water. 30 minutes after the deposition, mixing takes place in the proportion 2 moles of zirconium dimethacrylate di-n-propoxide (10 g of solution C) for 1 mole of 3-methacryloxypropyltrimethoxysilane (3.6 g of solution D) so as to obtain solution B.

4) A solution of composite material E was prepared by commencing with the synthesis of a zirconium dioxide sol. 129 g of octohydrated zirconium oxychloride are dissolved in 600 g of deionized, pure water, followed by the addition thereto of 27.6 g of urea. This aqueous suspension is filtered to 0.2 micron and then treated in a reactor under hydrothermal pressure at 220° C. (i.e. a vapour pressure of 2318 kPa) for 10 hours. This gives a bright, voluminous, white precipitate. The pH of the supernatant liquid is 7 and the latter is eliminated by suction. The precipitate is freed from its ionic impurities ($NH_4Cl$) by three successive washings with deionized water, followed by centrifuging (4500 r.p.m. for 10 min).

During said centrifuging, the precipitate obtained in the aqueous medium (20 wt. % concentration) is replaced and this is followed by dialysis for one night in a volume of 3 liters of ultra-pure water, at approximately pH 6.5. The absence of chloride ions in the dialysis water is tested by the addition of 1 milliliter of silver nitrate solution. The washed precipitate is then peptized in 100 g of deionized water previously acidified with 2 g of concentrated hydrochloric acid (37%). The sol then undergoes an ultrasound treatment for 2 hours, the pH being approximately 2. This is followed by the concentration of the sol using a rotary evaporator until a weight of 123 g is obtained, i.e. a 40% zirconium oxide aqueous sol.

Preparation also takes place of an aqueous solution by dissolving 10.5 g of polyvinyl pyrrolidone (molecular weight 360,000) in 150 g of deionized water, heated to 85° C. and accompanied by stirring. This clear solution contains 7 wt. % of polyvinyl pyrrolidone polymer. The composite material E with the high refractive index according to the invention is obtained by mixing 745 g of pure methanol with 124 g of 7% polymer aqueous solution, then by adding said mixture in progressive manner to 124 g of 40% $ZrO_2$ aqueous sol, accompanied by stirring. The use of ultrasound is beneficial at this stage in order to obtain a correct dispersion of the composite sol E, which finally contains 5% zirconium dioxide and 0.9% polymer in a solvent constituted by 20% water and 80% methanol. This composite sol E is filtered on a cellulose fibre filter. The average size of the $ZrO_2$ colloids is determined by laser size analysis and corresponds to 30 nanometer particles. The viscosity is approximately 3 centipoises. Prior to use, addition takes place of 0.5 ml of Triton-X 100 surfactant, which improves the appearance of the coatings obtained.

5) A solution F has been prepared by mixing 2092.5 g of absolute ethanol with 273.42 g of distilled tetraethylorthosilicate (167° C.; $10^5$ Pa). The mixture was homogenized by stirring for 5 minutes. This was followed by the slow addition of 72.6 g min 28% ammonia, whilst maintaining regular stirring. Hydrolysis was allowed to take place for 48 hours at 25° C. giving a pH of approximately 10.5. It was found that the solution F had become opalescent once the reaction ended. Solution F contains approximately 20 nm diameter silica colloids. The colloidal sol was then made to flow back in order to eliminate the dissolved ammonia so as to give a pH of approximately 5.5. Such a mixture contains 3.3 wt. % silica.

6) A siloxane solution G was prepared by mixing 232.5 g of absolute ethanol, 17.5 g of deionized water, 1.5 g of concentrated HCl and 17 g of distilled tetraethylorthosilicate.

7) 350 g of solution of F was mixed with all solution G in order to obtain a treating solution H, which was allowed to react for 48 hours. This gave a solution H containing in all 2.7 wt. % silica, whereof 70% were in colloidal form and 30% in the form of soluble polymers, said solution having an approximate pH of 1.5. Solution H was then filtered on glass fibres.

8) A solution J was prepared by diluting 3 wt. % of pure 1H,1H,2H,2H-perfluorodecyltriethoxysilane in anhydrous n-butanol.

9) A solution K was prepared by dissolving AF 2400 (registered trademark) fluorine polymer (manufactured by E. I. Du Pont de Nemours), in a perfluorine solvent Fluorinert FC-75 (registered trademark manufactured by 3M). The Teflon AF weight concentration is 0.075%.

10) In example 1, the successive deposits are all made by spin coating.

On the cleaned substrate 17 was deposited 2 $cm^3$ of solution A (corresponding to the adhesion promoting coating 19) at a rotary speed of 1800 r.p.m. It was allowed to dry for 1 minute, the substrate 17 still rotating, followed by the application at a speed of 1200 r.p.m. of 2 cm of solution B (corresponding to the average refractive index coating 21). The drying of the latter coating took 90 seconds whilst maintaining rotation. The thus treated substrate 17 was then irradiated under UV-B for 5 minutes, avoiding the formation of ozone by gaseous scavenging (e.g. nitrogen).

This was followed by the deposition on said substrate of 2 cm of solution E (corresponding to the high refractive index coating 11) at 600 r.p.m. The drying time was 90 seconds, whilst maintaining rotation. The thus treated substrate was then irradiated under UV-C for 10 minutes and under gaseous scavenging.

This was followed by the application of 2 $cm^3$ of solution A (corresponding to the coupling agent coating 23) at a speed of 1800 r.p.m., accompanied by the continuation of the rotation for 1 minute. This deposition was immediately followed by the application of 2 $cm^3$ of solution H (corresponding to the low refractive index coating) at 1300 r.p.m., whilst maintaining rotation for 90 seconds. The substrate 17 covered in this way was then heated at 120° C. for 30 minutes. Then, after cooling, on said substrate was deposited 2 $cm^3$ of solution J (corresponding to the coupling agent coating 27), by spin coating at 1800 r.p.m. and whilst maintaining rotation for 1 minute.

On two occasiosn 2 $cm^3$ of solution K were applied (corresponding to the antiabrasive coating 29) at a speed of 1500 r.p.m., accompanied by drying in air for 90 seconds accompanied by rotation. This was followed by the treatment of the coating obtained for 15 minutes at 120° C.

The mechanical thicknesses deposited are in this case respectively 98, 174 and 115 nanometers for the optical coatings 21, 11 and 25 (FIG. 3). Thus the total thickness of such a coating is approximately 0.4 micron.

Optical properties of the antireflection material prepared according to example 1

Figure 4:
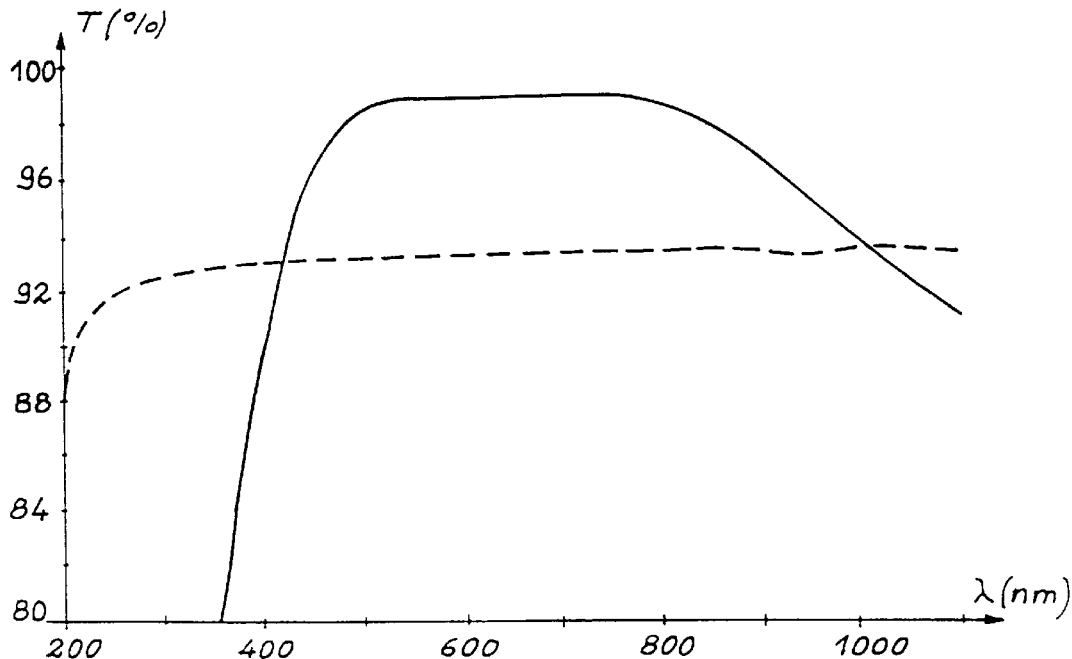
FIG. 4 A graph showing the value of the transmission (T), as a function of the wavelength (λ) for a bear silica substrate and for an antireflection material according to the invention.

The vitreous substrate 17 treated on its two faces reveals by spectrophotometry the following transmission factors (cf. FIG. 4):

T=99.0%±0.2 at=750 nm
T=98.8%±0.2 at=650 nm
T=99.2%±0.2 at=550 nm.

The continuous line curve represents the results obtained with the antireflection material of the aforementioned example, whereas the dotted line curve illustrates for comparison purposes the results obtained with a bare silica substrate.

Mechanical properties of the antireflection material prepared according to example 1

The antireflection coating according to the invention corresponding to example 1 was tested with respect to its mechanical resistance or strength properties and the results are given below:

Test 1: After 10 "drag wipe" wiping operations, i.e. using an ethanol-impregnated blotting paper, engaged on the coated substrate surface and then regularly pulled, no damage was observed under the Reichert MEF 3×50 microscope.

Test 2: After 10 manual wiping operations with a soft rag (rag 4012 from International Clean Products Inc.), impregnated with ethanol, no damage was observed.

Test 3: After 10 manual wiping operations with a rag identical to that of test 2, but in the dry state, no damage was observed.

Test 4: Finally, after adhering and pulling off an adhesive tape of the Scotch Magic type (registered trademark manufactured by Scotch Inc.), once again no damage was observed.

Test 5: After 5 gumming cycles with a translucent gum, no damage was observed.

Climatic resistance properties of the antireflection material prepared according to example 1

The climatic resistance properties of the antireflection material were also tested. It was found that there was no wettability even by salt water. This means that the coating of the substrate 17 is highly hydrophobic. Moreover, after leaving the antireflection material for 24 hours at 25° C. under a relative humidity of 96%, no damage was observed. The start of an attack to the coating of the invention after spending 60 minutes in deionized water at boiling point and a pressure of 1 atm (10 Pa) was observed, but the antireflection power remained intact.

Laser flux resistance properties of the antireflection material prepared according to example 1

Finally, tests were carried out on the laser flux resistance properties. The damage threshold for plastic substrates according to the invention is in fact limited by the intrinsic resistance of the substrate to laser action. On a silica substrate, the antireflection coating according to the invention withstands energy densities of 21 to 25 $J/cm^2$ for a pulse time of 3 nanoseconds and at a wavelength of 1064 nm (near infrared). Consequently the damage threshold is 2 to 3 times higher than those of the substrates treated according to the prior art. Complimentary measurements performed at a wavelength of 530 nm (visible) with a pulse time of 10 nanoseconds demonstrated a damage threshold above 12 $J/cm^2$.

Figure 5:
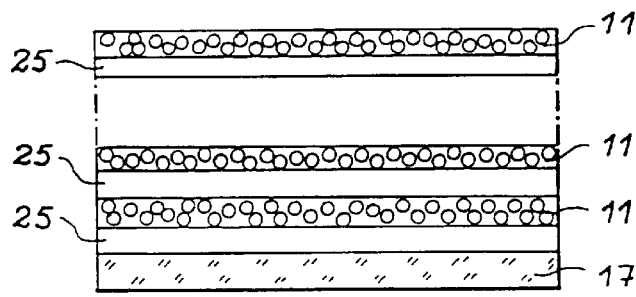
FIGS. 5 & 6 Sectional views of a first and a second embodiment of the reflecting material according to the invention.

FIG. 5 illustrates a second example of an optically active material, namely a wide spectral band reflecting material.

According to the features of the invention, said material comprises an organic or inorganic substrate 17, on which is deposited at least one group of two coatings namely:

a low refractive index coating 25 and
a high refractive index coating 11.

The substrate 17 and the coatings 25 and 11 are identical to those described in the production of the antireflection material.

The deposition process of the successive coatings of the reflecting material will now be described relative to FIG. 5.

Advantageously, but optionally, the organic or inorganic substrate firstly undergoes meticulous cleaning, as described for the production of the antireflection material.

This was followed by the deposition on the cleaned substrate 17 of a first, low refractive index coating 25 using one of the solution deposition methods described hereinbefore (immersion, laminar flow or spin coating). As the solvent of the suspension is advantageously chosen from among aliphatic alcohols, the drying time is relatively short (a few minutes) and it is possible to deposit the high refractive index coating 11. After drying, said composite coating undergoes a UV-C photopolymerization stage so as to obtain a virtually complete crosslinking of the polymer. This is a stage necessary for the continuation of the stack, because in the absence of UV irradiation, the polymer remains partly soluble in alcohols and therefore disturbs the subsequent deposit. This was followed by the repetition of the aforementioned deposition operations for the number of times needed so as to obtain the desired reflectivity.

Figure 6:
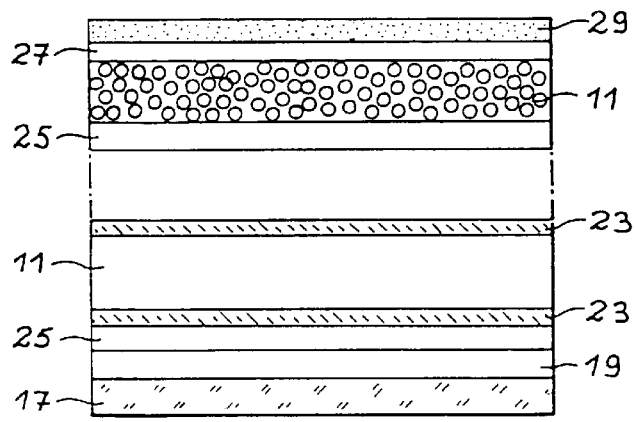

The reflecting material which has just been described has satisfactory optical performance characteristics and correct abrasion resistance properties. However, the mechanical behaviour of the coating can be improved by using coupling agents between the optically active coatings, as well as by terminating a stack with an antiabrasive coating. This second reflecting material type is described hereinafter relative to FIG. 6.

This reflecting material comprises an organic or inorganic substrate on which is deposited an adhesion promoting coating 19 chosen from among organosilanes, at least one group of the four following coatings:

a low refractive index coating 25,
a bonding agent coating 23,
a high refractive index coating 11 and
a bonding agent coating 23.

During the deposition of the final group of four coatings, the last bonding agent coating is eliminated. The production of said reflecting material is completed by depositing an adhesion promoting coating 27 and an antiabrasive coating 29 of fluorine polymer.

The deposition methods and materials are identical to those described in the other processes.

Hereinafter are given two exemplified embodiments of a reflecting material according to the invention. The first relates to the production of a mirror in the near infrared range on an inorganic substrate and having no particular abrasion resistance properties. The second relates to the production of a plate which is semireflecting in the visible range, formed on a plastic substrate and having improved resistance and water repelling properties.

These deposition operations are performed in a minimum class 100 clean environment (US standard) and under a laminar flow.

Example 2: Producing a Reflecting Material

1) Use is made of an inorganic, glass substrate 17 (white glass B270 marketed by Schott), with a surface area of 200×200 mm and a thickness of 6 mm. Its refractive index is 1.52 at a wavelength of 600 nm and its polishing quality is $3\lambda.(\lambda=1.06$ micron).

The substrate 17 was cleaned with a detergent solution formed from 0.6 ml of Triton-X 100, 0.6 ml of Renex 690 (registered trademarks) and 60 ml of pure, deionized water. The substrate 17 was then abundantly rinsed with deionized water and then isopropyl alcohol filtered to 0.2 micron. Finally, the substrate 17 was replaced in an ozone/UV photoreactor (of type PR 100 marketed by UVP Inc.), with $O_2/H_2O_2$ bubbling for a 5 minute cycle, so as to make the faces of the substrate 17 very hydrophilic.

2) This was followed by the preparation of a colloidal silica sol A' by mixing 1046.3 g of absolute ethanol with 136.7 g of distilled tetraethylorthosilicate (167° C., $10^5$ Pa). The mixture was homogenized by stirring for 5 minutes. Whilst maintaining said stirring, there was then an addition of 36.3 g of min 28% ammonia. The hydrolysis and condensation reaction requires a minimum of 48 h at 25° C. in order to be complete. An opalescence remains, which reveals the formation of silica colloids. The size analysis performed reveals an average colloid diameter of 21±9 nm. The final pH of said sol is approximately 10.5 and the $SiO_2$ weight concentration is 3.2%. Prior to use, the silica sol A' is filtered to 0.2 micron.

3) A composite sol B' was prepared in the same way as the solution E in example 1.

4) In example 2, advantageously the successive coatings are deposited by laminar flow coating. Deposition takes place on the substrate 17 of a first coating of solution A' (corresponding to the low refractive index coating 25) and then following the drying of the latter deposition takes place of a composite material B' ($ZrO_2$-PVP), (corresponding to the high refractive index coating 11).

After drying the second coating, the substrate 17 is irradiated for 10 minutes under UV-C (180 to 280 nm wavelength), whilst avoiding the formation of ozone in contact with the polymer by gaseous scavenging (e.g. nitrogen).

The preceding sequence is repeated 8 times more, so as to finally obtain a substrate 17 treated on one face with a covering having 18 coatings, i.e. 9 pairs ($SiO2/ZrO_2$-PVP). Optical properties of the reflecting material prepared in example 2

Figure 7:
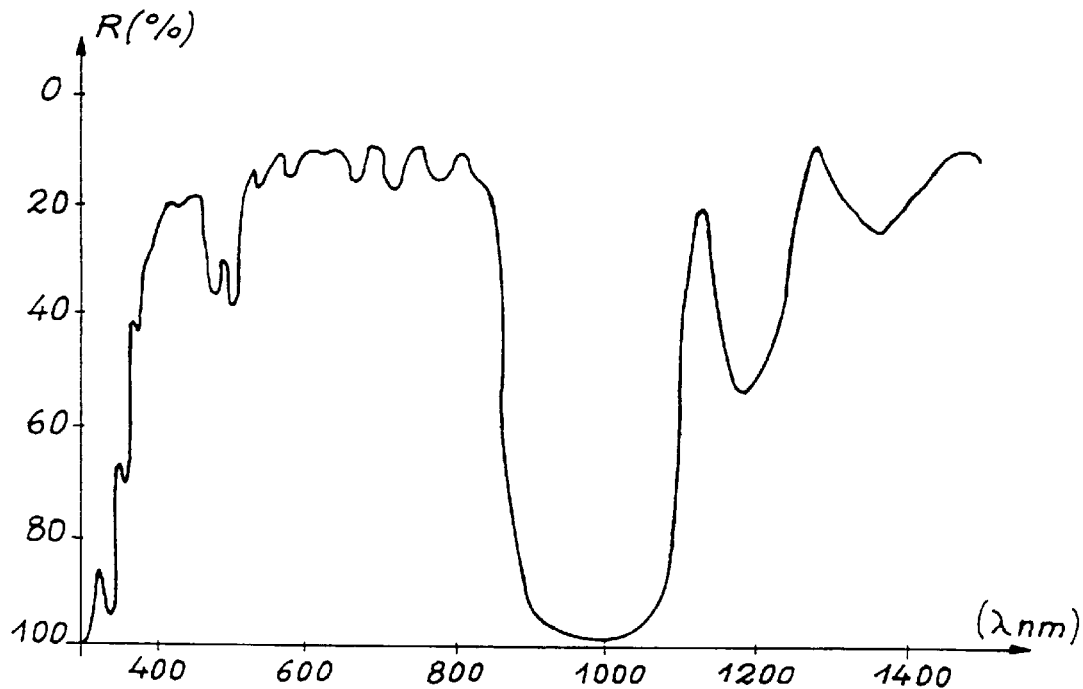
FIG. 7 A graph showing the value of the reflection (R), as a function of the wavelength (λ) of an exemplified reflecting material according to the invention.

The thus treated substrate 17 reveals by spectrophotometry the following reflection factors (cf. FIG. 7):

normal incidence: R=99% at λ=980 nm, with a spectral width of 100 nm, i.e. +50 nm around 980 nm: R>98%.

Mechanical properties of the reflecting material prepared in example 2

The fact of having as the outer coating a composite deposite which has undergone a photopolymerization assistance stage gives the mirror interesting abrasion resistance properties. Thus, said mirror can be wiped on a number of occasions manually using a soft rag (ref. 4012 of International Clean Products Inc.) soaked with ethanol or in dry form. No damage was observed.

Laser resistance properties of the reflecting material prepared according to example 2

The laser flux resistance measurements performed on this infrared mirror reveal damage thresholds from 14 to 18 J/cm for a pulse time of 3 nanoseconds at a wavelength of 1.05 micron.

Example 3: Production of a Reflecting Material Having Improved Abrasion Resistance Properties 1) Use was made of an organic polyallyl carbonate substrate (designation CR 39, registered trademark) with a diameter of 80 mm, a thickness of 2 mm and a refractive index of 1.50 at a wavelength of 600 nm. This substrate was cleaned with a detergent solution identical to that used in example 2 and abundantly rinsed with deionized water and then isopropyl alcohol filtered to 0.2 micron.

2) A solution C' was prepared identical to solution H of example 1.

3) A solution D' was prepared by mixing 940 g of deionized water with 2.95 g of concentrated hydrochloric acid (37 wt. %). The pH of the solution is 1.5. To said acid solution are added 63.35 g of titanium tetraisopropoxide, accompanied by stirring. A whitish precipitate appeared. The molar ratio (HCl:Ti) is 0.13. This suspension is stirred at ambient temperature for 15 days. During this period, peptization takes place of the titanium dioxide colloids. The resulting solution is then concentrated with a rotary evaporator under reduced pressure until a 30 wt. % $TiO_2$ concentration is obtained (instead of 1.8% initially).

This is followed by the preparation of a solution E' containing 2.5 g of polyvinyl pyrrolidone (molecular weight 360,000) dissolved, accompanied by stirring, in 384 g of pure methanol. This clear solution E' contains 0.65 wt. % of polyvinyl pyrrolidone. The composite sol D' was prepared by mixing the solution E' with the aqueous $TiO_2$ sol concentrated to 30% and accompanied by stirring and under ultrasound. The composite sol D' is then homogeneous and contains 4 wt. % of colloidal titanium dioxide and 0.5% of polymer (i.e. a PVP:$TiO_2$ weight ratio of 13%), in a solvent constituted by 90% methanol and 10% water. The pH is approximately 3. This composite sol D' is filtered on a cellulose fibre filter. Prior to use, addition takes place of 0.5 ml of Triton-X 100 surfactant, which improves the appearance of the deposited coatings.

4) A solution F' was prepared by diluting to 4 wt. % 3-glycidoxypropyltrimethoxysilane (i.e. 4 g) in 96 g of anhydrous 1-butanol (previously dried on a molecular sieve).

5) Preparation took place of a solution G' identical to solution G in example 1.

6) Preparation took place of a solution H' identical to solution K of example 1.

7) In example 3, all the deposits are made by spin coating. On the cleaned substrate was firstly deposited 2 $cm^3$ of solution F' at a rotation speed of 1500 r.p.m. Drying took place for 1 minute with the substrate still rotating, followed by the application of 2 cm of solution C' at a speed of 1400 r.p.m. The drying of the last coating took 90 seconds, whilst maintaining rotation. The treated substrate was then heated at 120° C. for 15 minutes.

After cooling, deposition again took place of 2 $cm^3$ of solution F' at 1500 r.p.m. and allowing the latter to dry for 1 minute accompanied by rotation. Immediately thereafter application took place of 2 $cm^3$ of solution D' at a speed of 1700 r.p.m. The drying time of the last coating is 90 seconds with rotation continuing. The thus treated substrate was then irradiated under UV-C for 10 minutes and with gaseous scavenging.

This was followed by the deposition of a coating of solution F' (2 cm ) at 1500 r.p.m. for 1 minute, then the deposition of solution G' (2 cm) at 1400 r.p.m. and then, maintaining this rotation speed, deposition took place after 1 minute and on two occasions of 2 $cm^3$ of solution H', whilst drying in air (whilst rotating) for 90 seconds between each application. The covering obtained was then treated for 30 minutes at 120° C.

Optical properties of the reflecting material prepared according to example 3

Figure 8:
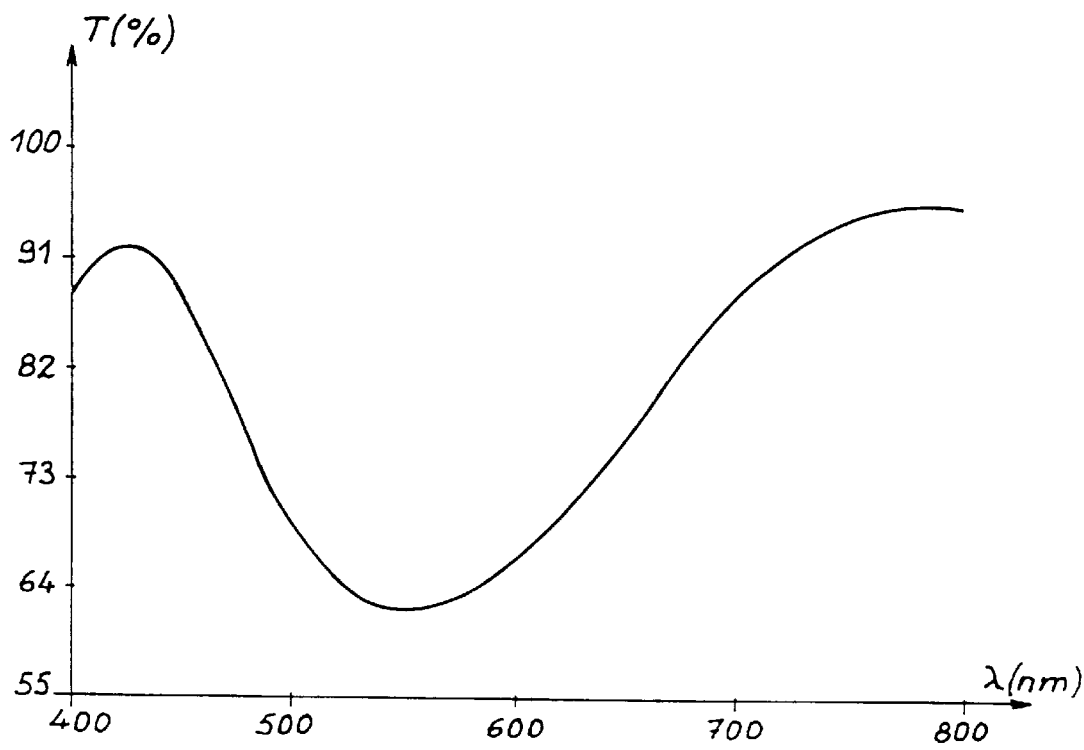
FIG. 8 A graph showing the value of the transmission (T), as a function of the wavelength (λ) of another exemplified reflecting material according to the invention.

The plastic substrate treated on one face in this way reveals by spectrophotometry the following transmission factors (cf. FIG. 8):

T=63.5% at λ=550 nm,

T=68.0% at λ=500 nm,

T=66.2% at λ=600 nm.

The maximum reflection of such a two-coating stack ($SiO_2$/$TiO_2$-PVP) is therefore 36% in the visible spectrum (550 nm).

Mechanical properties of the reflecting material prepared according to example 3

The semireflecting plastic substrate of example 3 was tested with regards to its mechanical strength. Tests 1 to 5 of example 1 were identically reproduced on the semireflecting material and no damage was observed.

There was also a satisfactory behaviour in time of the material. In other words there was no delamination of the reflecting coating after several months or after repeated torsion tests on the plastic substrate (within the flexibility limit).

Climatic resistance properties of the reflecting material according to example 3

It was found that there was no wettability even by salt water, so that the reflecting coating is highly hydrophobic. Moreover, after leaving the reflecting material for 24 hours at 25° C. under a relative humidity of 96%, no damage was observed.

We claim:

1. A composite material having a refractive index above about 1.6, comprising:

a mineral phase composite consisting essentially of:
   (i) 60–99% of $SiO_2$ or metal oxide colloid coated with,
   (ii) 1–40% of a crosslinked polyvinyl polymer, wherein said crosslinked polyvinyl polymer is selected from the group consisting of polyvinyl alcohols and polyvinyl pyrrolidones, and said crosslinked polyvinyl polymer, prior to crosslinking, is soluble in a solvent containing alcohol and water.

2. A process for the production and deposition of the composite material according to claim 1, comprising the stages of:

preparing a suspension of $SiO_2$ or metal oxide colloids dispersed in an aliphatic alcohol, mixing said colloidal suspension with a polyvinyl polymer soluble in a solvent containing alcohol and water, depositing the mixture obtained on a support so as to form a uniform coating and crosslinking said coating by an irradiation treatment with ultraviolet rays having a wavelength between approximately 180 and 280 nm.

3. The process according to claim 2, wherein the mixture of the colloidal suspension with the polyvinyl polymer comprises by weight, between approximately 3 and 8% $SiO_2$ or metal oxide colloids and between approximately 0.1 and 2% polyvinyl polymer, based on the solvent containing the alcohol and the water.

4. A composite material first coating having a refractive index above about 1.6, comprising:

a mineral phase composite consisting essentially of:
   (i) 60–99% of metal oxide colloid selected from the group consisting of scandium oxide, yttrium oxide, lanthanum oxide, titanium oxide, zirconium oxide, hafnium oxide, thorium oxide, niobium oxide, tantalum oxide and aluminum oxide, coated with,
   (ii) 1–40% of a crosslinked polyvinyl polymer, wherein said crosslinked polyvinyl polymer is selected from the group consisting of polyvinyl alcohols and polyvinyl pyrrolidones, and said crosslinked polyvinyl polymer, prior to crosslinking, is soluble in a solvent containing alcohol and water.

5. An optically active material comprising an organic or inorganic substrate coated with at least a first coating of composite material having a refractive index above about 1.6, comprising:

a mineral phase composite consisting essentially of:
   (i) 60–99% of $SiO_2$ or metal oxide colloid coated with,
   (ii) 1–40% of a crosslinked polyvinyl polymer, wherein said crosslinked polyvinyl polymer is selected from the group consisting of polyvinyl alcohols and polyvinyl pyrrolidones, and said crosslinked polyvinyl polymer, prior to crosslinking, is soluble in a solvent containing alcohol and water.

6. The material according to claim 5, further comprising at least one coating chosen from among:

a second coating having a refractive index below about 1.4, formed from colloids of silicon dioxide, calcium fluoride or magnesium fluoride coated with a siloxane binder, a third coating having a refractive index between approximately 1.4 and 1.6 formed from a material incorporating an organosiloxane and an organometallic material modified by the fixing of organic radicals, an adhesion promoting coating formed from a material selected from the group consisting of organosiloxanes and aiding adhesion between the substrate and said first, second or third coating.

a bonding agent coating made from a material selected from the group consisting of organosiloxanes and aiding the bonding between two members selected from the group consisting of said first coating, said second coating, and said third coating, a coating of a coupling agent selected from the group consisting of perfluorosiloxanes and silazanes, or an antiabrasive coating based on fluorine polymer.

7. The material according to claim 6, having antireflection, water repelling and abrasion resistance properties, comprising an organic or inorganic substrate, successively covered by:

the adhesion promoting coating, the third coating, the first coating, the bonding agent coating, the second coating, the coupling agent coating, and the antiabrasive coating.

8. The material according to claim 6, having reflecting properties, comprising an organic or inorganic substrate, successively covered by at least one group of two coatings comprising the second coating and the first coating.

9. The material according to claim 6, having reflecting and abrasion resisting properties, comprising an organic or inorganic substrate, successively covered by:

the adhesion promoting coating, at least one group of the three following coatings:

the second coating, the bonding agent coating, and the first coating, the bonding agent coating being placed between each group of three successive coatings, the adhesion promoting coating and the antiabrasive coating.

10. The material according to claim 6, wherein the substrate is inorganic and that the adhesion promoting coating is of epoxy-alkoxysilane.

11. The material according to claim 6, wherein the substrate is organic and that the adhesion promoting coating is of γ-amino-alkoxysilane or epoxy-oxo-alkoxysilane.

12. The material according to claim 6, wherein the coating is formed from a material incorporating titanium or zirconium alkoxide or methacryloxypropyltrimethoxysilane.

13. The material according to claim 6, wherein the bonding agent coating is selected from the group consisting of prehydrolyzed epoxyalkoxysilanes containing a basic condensation catalyst.

14. The material according to claim 6, wherein the coupling agent coating is selected from the group consisting of hexamethyl disilazane and 1H,1H,2H,2H-perfluorodecyltriethoxysilane.

15. The material according to claim 6, wherein the antiabrasive coating is of polytetrafluoroethylene.

* * * * *